US012026025B2

(12) United States Patent
Furujiku et al.

(10) Patent No.: US 12,026,025 B2
(45) Date of Patent: Jul. 2, 2024

(54) INFORMATION PROCESSING DEVICE HAVING A REMOVABLY ATTACHED STORAGE UNIT

(71) Applicant: Panasonic Intellectual Property Management Co., Ltd., Osaka (JP)

(72) Inventors: Masaru Furujiku, Osaka (JP); Ryusuke Teramoto, Osaka (JP); Munehiro Torii, Osaka (JP); Tatsuo Kuromoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/535,854

(22) Filed: Nov. 26, 2021

(65) Prior Publication Data
US 2022/0083105 A1    Mar. 17, 2022

Related U.S. Application Data

(63) Continuation of application No. PCT/JP2020/020072, filed on May 21, 2020.

(30) Foreign Application Priority Data

Jun. 7, 2019    (JP) .................................. 2019-107138

(51) Int. Cl.
*G06F 1/18*    (2006.01)
*G06F 1/16*    (2006.01)

(52) U.S. Cl.
CPC ............ *G06F 1/187* (2013.01); *G06F 1/1658* (2013.01); *G06F 2200/163* (2013.01)

(58) Field of Classification Search
CPC ...... G06F 1/1658; G06F 1/1656; G06F 1/187; G06F 2200/163
See application file for complete search history.

(56) References Cited

U.S. PATENT DOCUMENTS

5,187,643 A * 2/1993 I-Shou ................. G11B 33/124
5,224,018 A * 6/1993 Kobayashi ............ G06F 1/1656
                                                   439/376

(Continued)

FOREIGN PATENT DOCUMENTS

CN          2577323 Y      10/2003
CN        201000597 Y       1/2008

(Continued)

OTHER PUBLICATIONS

International Search Report for corresponding Application No. PCT/JP2020/020072, mailed Aug. 11, 2020.

(Continued)

*Primary Examiner* — James Wu
(74) *Attorney, Agent, or Firm* — Renner, Otto, Boisselle & Sklar, LLP

(57) ABSTRACT

An information processing device includes a body in a plate shape, and a storage unit that includes a storage device and is removably attached to the body. The body includes a housing part in a recessed shape that is recessed in a thickness direction of the body, the housing part storing the storage unit, and a first connector provided on a bottom surface of the housing part. The storage unit includes a second connector connected to the first connector to be removably attached in the thickness direction.

6 Claims, 9 Drawing Sheets

(56) References Cited

U.S. PATENT DOCUMENTS

| | | | |
|---|---|---|---|
| 6,176,724 B1 | 1/2001 | Klatt | |
| 6,724,616 B2 * | 4/2004 | Kuo | G06F 1/1616 |
| | | | 361/679.02 |
| 7,095,607 B2 * | 8/2006 | Imamura | G06F 1/1635 |
| | | | 429/97 |
| 7,885,064 B2 * | 2/2011 | Chen | H01M 10/0436 |
| | | | 292/242 |
| 2006/0134940 A1 | 6/2006 | Motoe | |
| 2007/0218724 A1 | 9/2007 | Tanaka | |
| 2010/0073861 A1 | 3/2010 | Takeguchi | |
| 2016/0111814 A1 * | 4/2016 | Hirano | G11B 25/043 |
| | | | 439/271 |

FOREIGN PATENT DOCUMENTS

| | | |
|---|---|---|
| CN | 101154142 A | 4/2008 |
| JP | H02-077730 U | 6/1990 |
| JP | H03-171314 A | 7/1991 |
| JP | 2000-501881 A | 2/2000 |
| JP | 2000-155622 A | 6/2000 |
| JP | 2006-172371 A | 6/2006 |
| JP | 2007-250149 A | 9/2007 |
| JP | 2010-073154 A | 4/2010 |

OTHER PUBLICATIONS

English Translation of Chinese Office Action dated Sep. 20, 2023 for the related Chinese Patent Application No. 202080041465.5.

* cited by examiner

INFORMATION PROCESSING DEVICE HAVING A REMOVABLY ATTACHED STORAGE UNIT

BACKGROUND

1. Technical Field

The present disclosure relates to an information processing device such as a laptop personal computer.

2. Description of the Related Art

For example, Patent Literature (PTL) 1 discloses a laptop personal computer (information processing device) to which a hard disk (storage device) is removably attached. The laptop personal computer includes a body provided in its bottom surface with a recessed housing part for storing a hard disk. The recessed housing part is provided on its side surface with a connector connected to an interface connector of the hard disk. That is, the interface connector of the hard disk and the connector of the body are configured to be connected in a direction orthogonal to a thickness direction of the body.

PTL 1 is Unexamined Japanese Patent Publication No. 2007-250149.

SUMMARY

Unfortunately, the information processing device described in PTL 1 is required to slide the hard disk toward the connector of the body in a direction orthogonal to the thickness direction of the body, i.e., in a width direction or a depth direction of the body to connect the interface connector of the hard disk to the connector of the body after the hard disk is stored in the housing part. For a stroke of the movement, the body is required to have a movement space that is only used when the hard disk is attached or detached. This movement space limits a space for disposing components other than the storage device.

Thus, an object of the present disclosure is to fabricate an attaching and detaching structure of a storage device in a body of an information processing device to which the storage device is removably attached, the attaching and detaching structure requiring no movement space used for the storage device only when the storage device is attached and detached.

An information processing device provided by an aspect of the present disclosure includes a body in a plate shape, and a storage unit that includes a storage device and is removably attached to the body. The body includes a housing part in a recessed shape that is recessed in a thickness direction of the body, the housing part storing the storage unit, and a first connector provided on a bottom surface of the housing part. The storage unit includes a second connector connected to the first connector to be removably attached in the thickness direction.

The present disclosure enables fabricating the attaching and detaching structure of the storage device in the body of the information processing device to which the storage device is removably attached, the attaching and detaching structure requiring no movement space used for the storage device only when the storage device is attached and detached.

DETAILED DESCRIPTION

An exemplary embodiment will be described below in detail with reference to the drawings as appropriate. However, unnecessarily detailed description may be omitted. For example, the detailed description of already well-known matters and the redundant description of a configuration substantially identical to the already-described configuration may be omitted. A reason for this is to avoid unnecessary redundancy of the following description and to facilitate understanding of those skilled in the art.

The inventors of the present disclosure provide the accompanying drawings and the following description for those skilled in the art to fully understand the present disclosure, and do not provide them to intend to limit the subject matter described in the scope of claims Hereinafter, an information processing device according to an exemplary embodiment of the present disclosure will be described with reference to FIGS. 1 to 9.

Figure 1:
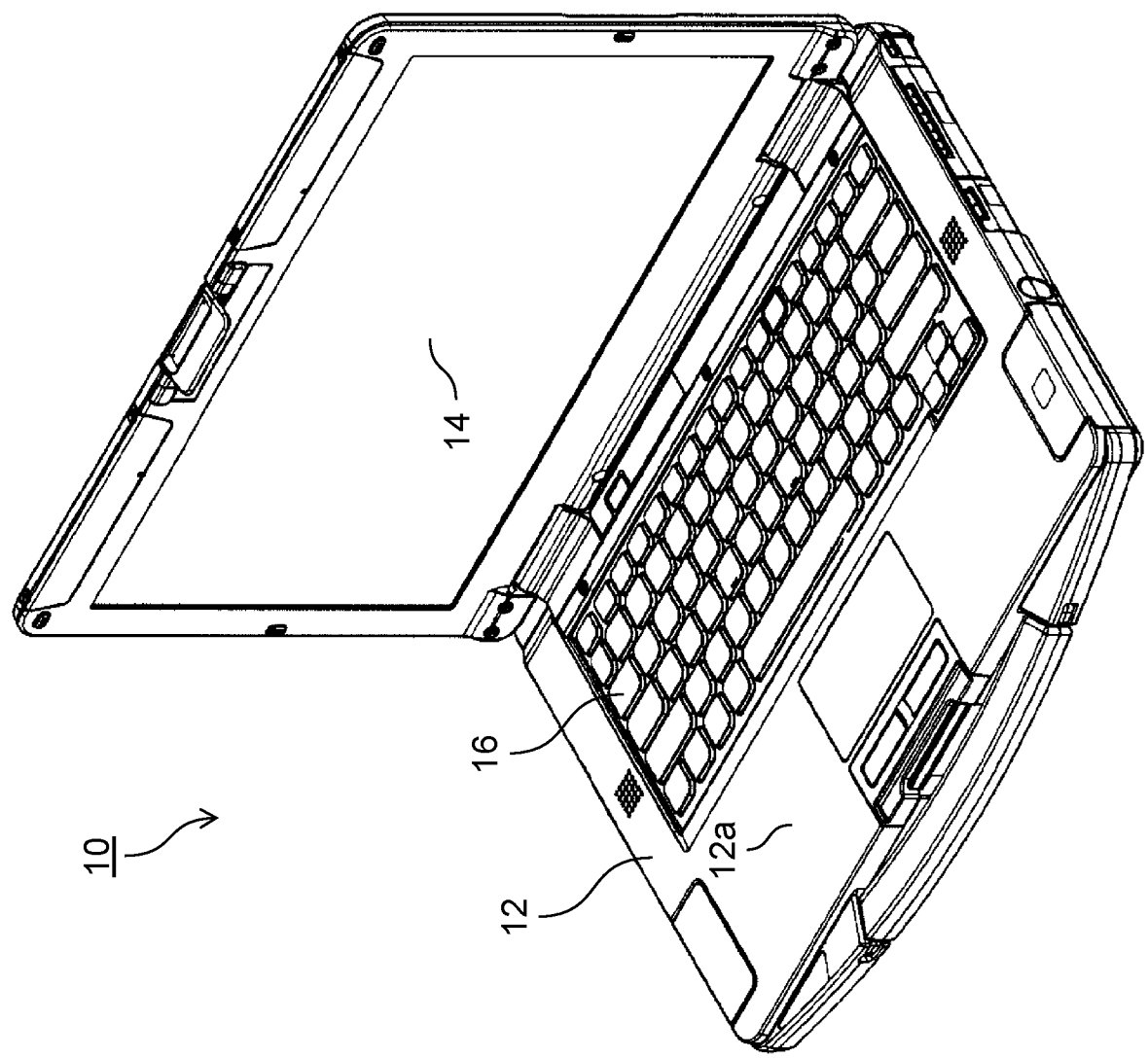
FIG. 1 is a perspective view of an information processing device according to an exemplary embodiment of the present disclosure.

FIG. 1 illustrates an information processing device according to an exemplary embodiment of the present disclosure. The drawings each show an X-Y-Z coordinate system that is for facilitating understanding of the exemplary embodiment of the present disclosure, and that does not limit the exemplary embodiment. The X-Y-Z coordinate system includes an X-axis direction that is a width direction of the information processing device, a Y-axis direction that is a depth direction, and a Z-axis direction that is a thickness direction.

As illustrated in FIG. 1, information processing device 10 according to the present exemplary embodiment is a so-called laptop personal computer, and includes body 12 and display 14 rotatably attached to body 12.

Body 12 of information processing device 10 has a plate shape that is smaller in size in the thickness direction (Z-axis direction) than in the width direction (X-axis direction) and in the depth direction (Y-axis direction). Body 12 incorporates a central processing unit (CPU) and others, and is provided on its upper surface 12a with keyboard 16.

Figure 2:
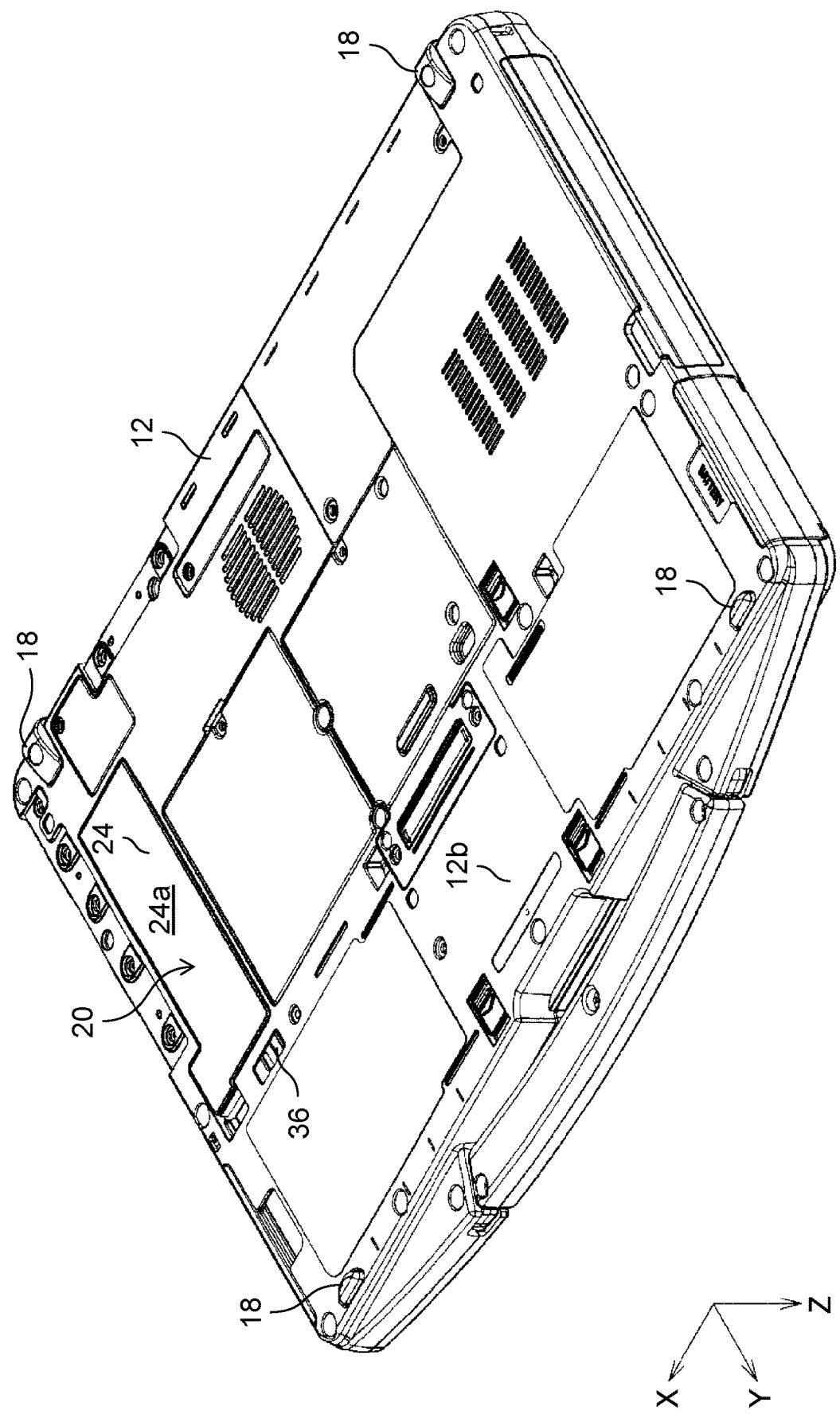
FIG. 2 is a perspective view illustrating a lower surface of a body of the information processing device.

FIG. 2 is a perspective view illustrating a lower surface of the body of the information processing device.

As illustrated in FIG. 2, a plurality of legs 18 is provided on lower surface 12b of body 12 of information processing device 10. In lower surface 12b, storage unit 20 is removably incorporated.

Figure 3:
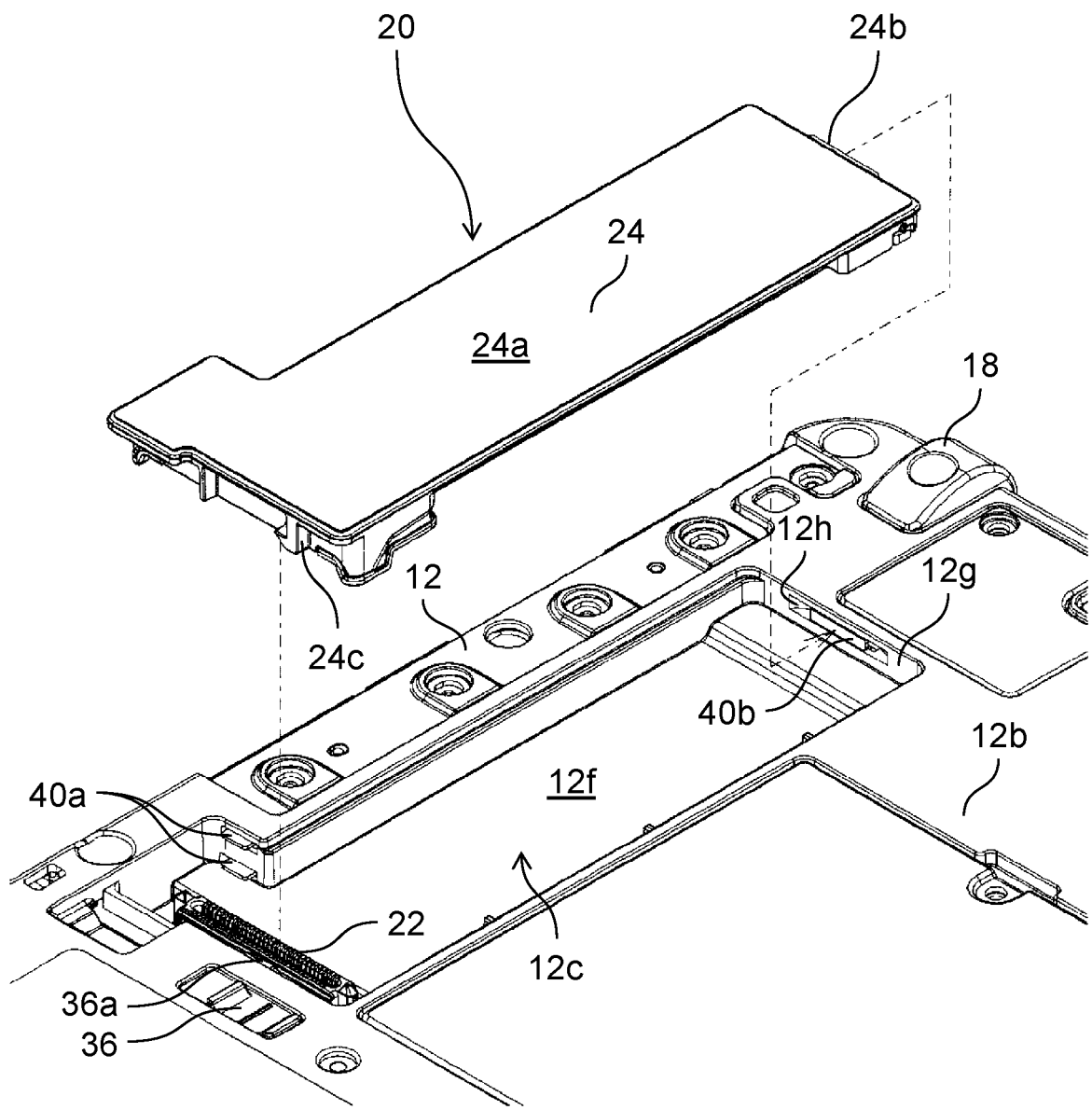
FIG. 3 is a partial perspective view of the body of the information processing device, illustrating a state in which a storage unit is removed from the body.
Figure 4:
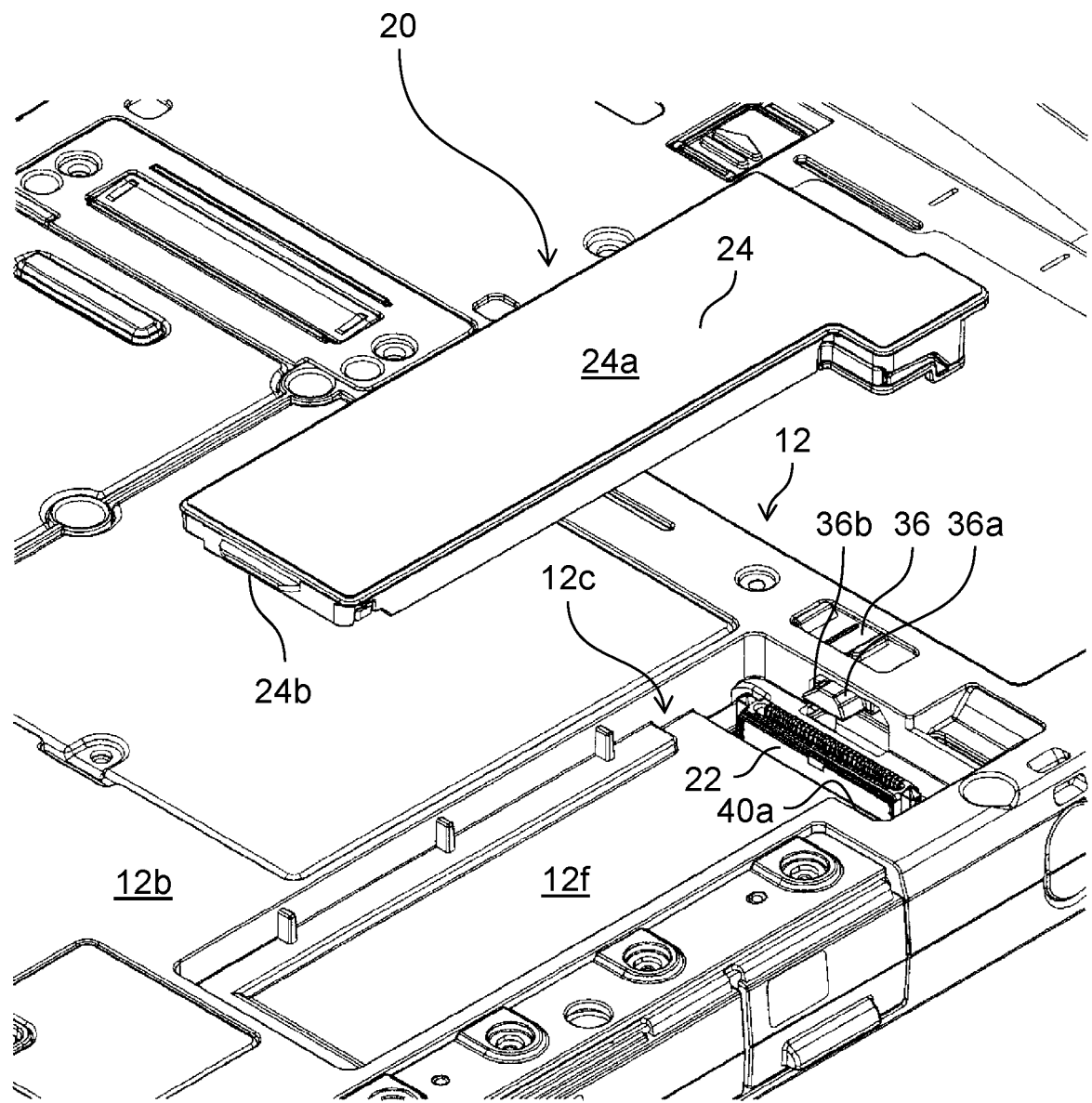
FIG. 4 is a partial perspective view of the body of the information processing device, illustrating a state in which the storage unit is removed from the body as viewed from a viewpoint different from that in FIG. 3.
Figure 5:
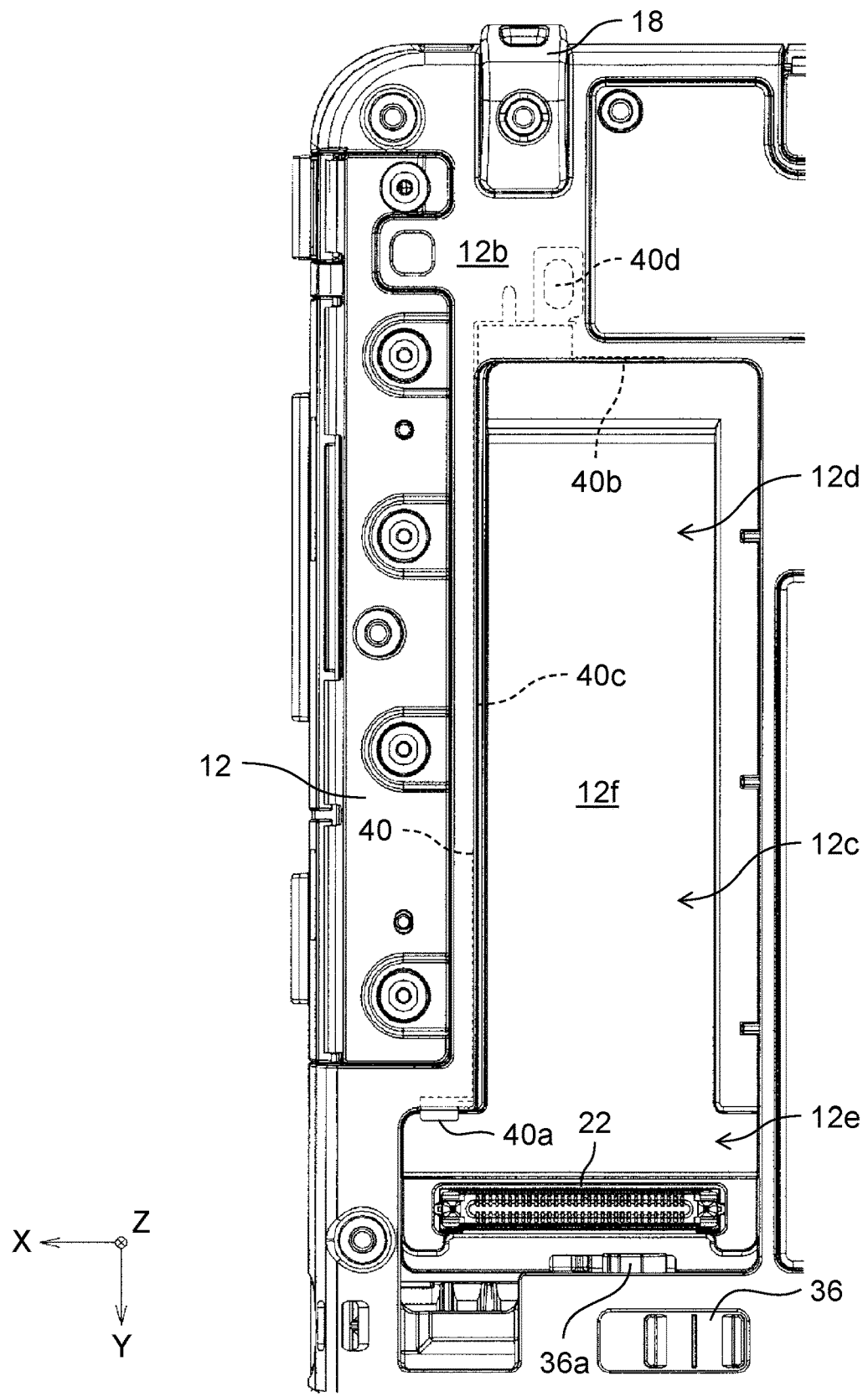
FIG. 5 is a partial bottom view of the body of the information processing device, illustrating a housing part for the storage unit.

FIG. 3 is a partial perspective view of the body of the information processing device, illustrating a state in which the storage unit is removed from the body, and FIG. 4 is a partial perspective view of the body of the information processing device, illustrating a state in which the storage unit is removed from the body as viewed from a viewpoint different from that in FIG. 3. FIG. 5 is a partial bottom view of the body of the information processing device, illustrating a housing part for the storage unit.

As illustrated in FIGS. 3 and 4, body 12 of the present exemplary embodiment is provided in its lower surface 12b with housing part 12c in a recessed shape that is recessed in the thickness direction (Z-axis direction) of body 12 and that stores storage unit 20.

As illustrated in FIG. 5 viewed in the thickness direction (Z-axis direction) of body 12, housing part 12c of the present exemplary embodiment stores storage unit 20 and includes first housing space 12d in a substantially rectangular shape extending in the depth direction (Y-axis direction) of body 12, and second housing space 12e in a substantially rectangular shape extending in the width direction (X-axis direction) of body 12 and communicating with one end of first housing space 12d in its extending direction (Y-axis direction). That is, housing part 12c has an "inverted L-shape".

Housing part 12c is provided on its bottom surface 12f, specifically on a portion of bottom surface 12f in second housing space 12e, with connector 22 (first connector) for connection to storage unit 20.

Connector 22 is provided on bottom surface 12f of housing part 12c to be parallel to body 12 in the width direction (X-axis direction) and to be connected to storage unit 20 in a direction parallel to the thickness direction (Z-axis direction) of body 12. Connector 22 is mounted inside body 12, and is connected to a circuit board (not illustrated), on which a CPU and the like are mounted, with a flexible cable (not illustrated), for example.

Details of storage unit 20 stored in housing part 12c in a recessed shape provided in lower surface 12b of body 12 will be described.

Figure 6:
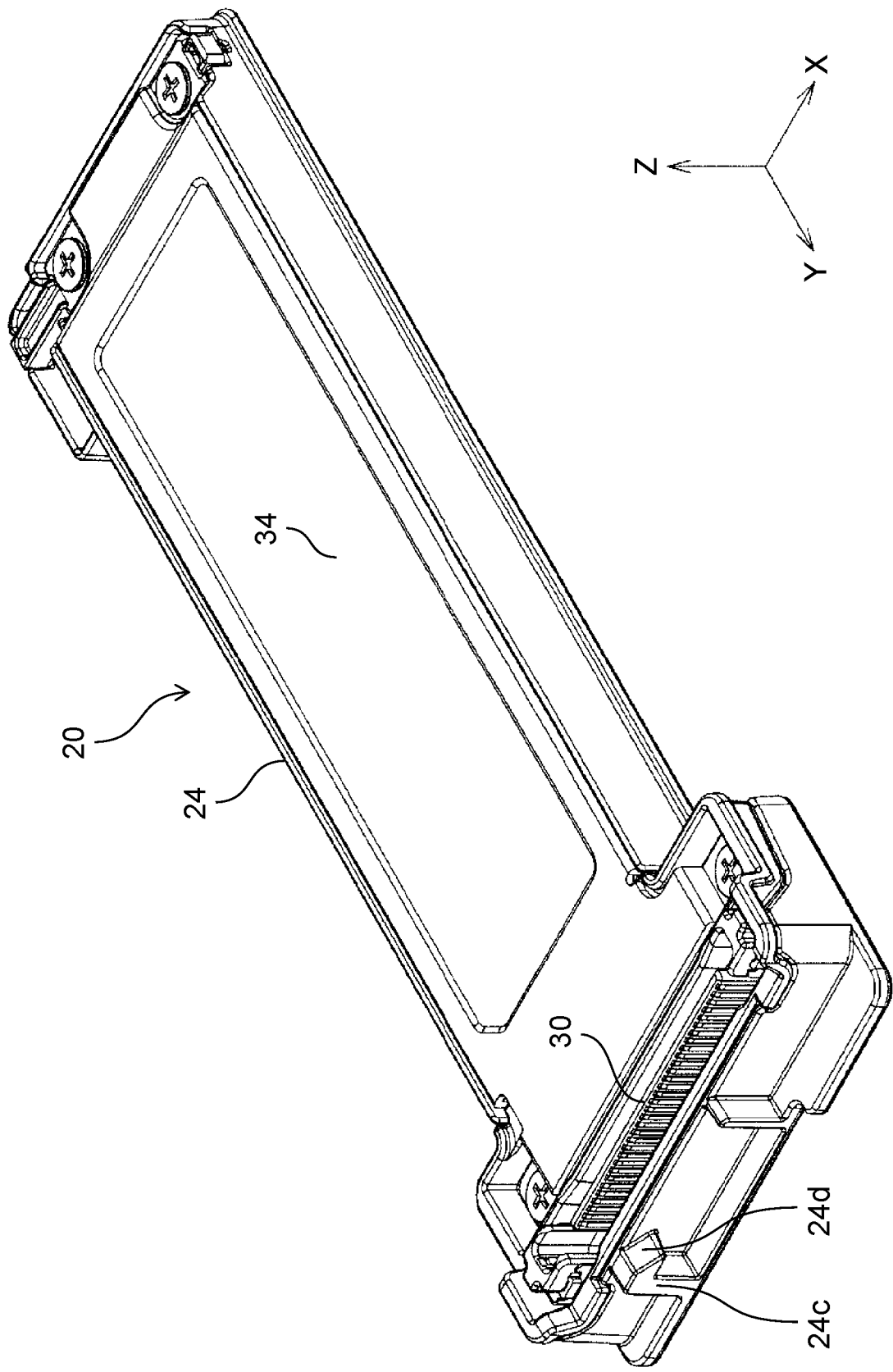
FIG. 6 is a perspective view of the storage unit.
Figure 7:
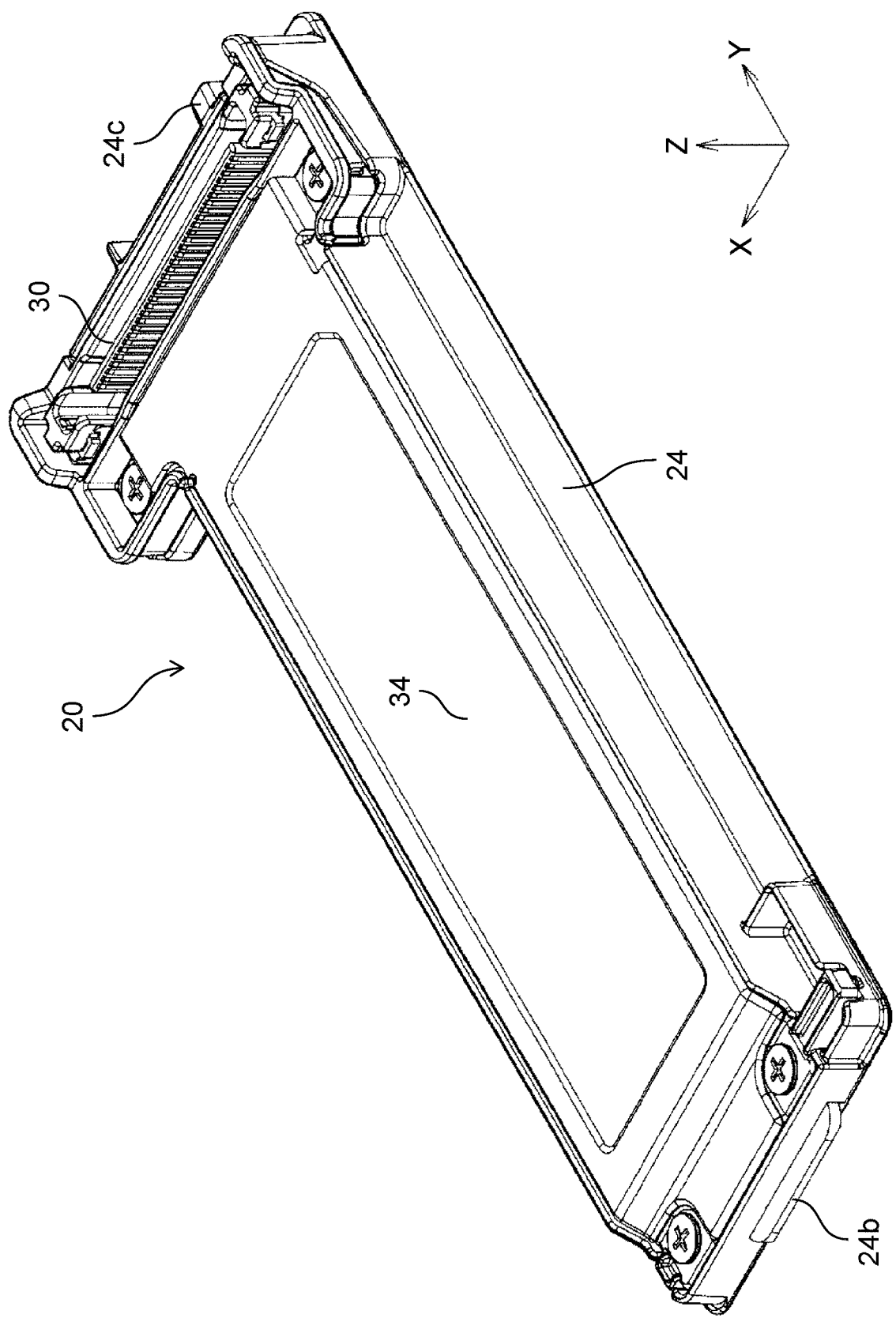
FIG. 7 is a perspective view of the storage unit viewed from a viewpoint different from that of FIG. 6.
Figure 8:
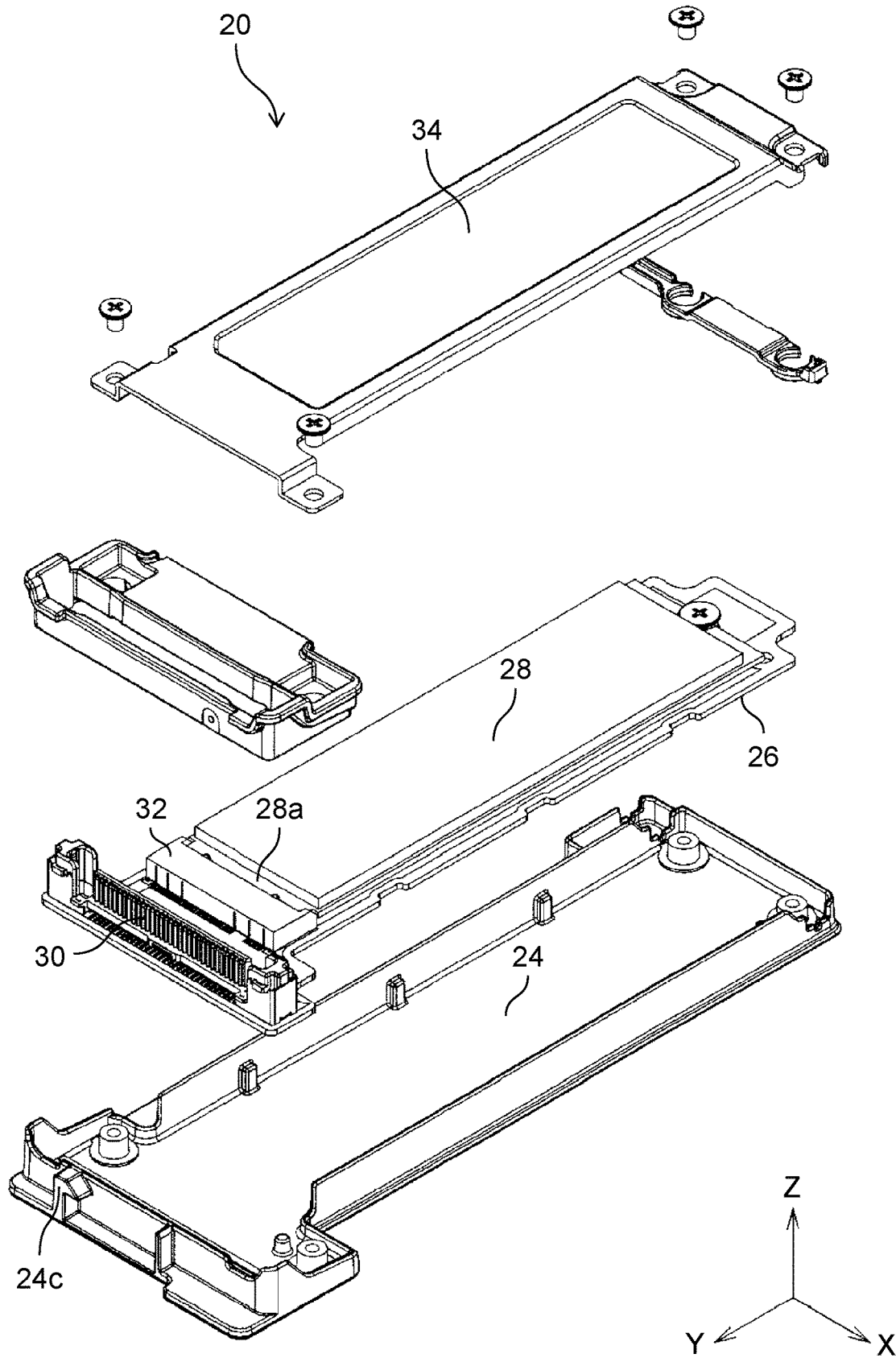
FIG. 8 is an exploded perspective view of the storage unit.

FIG. 6 is a perspective view of the storage unit, and FIG. 7 is a perspective view of the storage unit viewed from a viewpoint different from that of FIG. 6. FIG. 8 is an exploded perspective view of the storage unit.

As illustrated in FIGS. 6 to 8, storage unit 20 includes casing 24, circuit board 26 accommodated in casing 24, storage device 28 mounted on circuit board 26, two connectors 30, 32 mounted on circuit board 26, and cover 34 for covering and protecting circuit board 26.

Casing 24 of storage unit 20 of the present exemplary embodiment has a shape fitted into housing part 12c of body 12, i.e., has an "inverted L-shape" as viewed in the thickness direction (Z-axis direction) of body 12. As illustrated in FIG. 2, storage unit 20 stored in housing part 12c of body 12 has lower surface 24a positioned substantially flush with lower surface 12b of body 12, and each lower surface constitutes a part of a bottom surface of information processing device 10.

Casing 24 of storage unit 20 accommodates circuit board 26. On circuit board 26, storage device 28 is mounted.

As illustrated in FIG. 8, the present exemplary embodiment includes a solid state drive (SSD) mounted on circuit board 26 as storage device 28. For example, an SSD based on the M.2 standard is mounted as storage device 28.

Additionally, two connectors 30, 32 are mounted on circuit board 26.

One connector 30 (second connector) protrudes from circuit board 26 in the thickness direction (Z-axis direction) of body 12, and is connected to connector 22 provided in housing part 12c of body 12 to be removably attached in the thickness direction.

Another connector 32 (third connector) is connected to interface connector 28a of storage device 28 and is connected to interface connector 28a in a direction (Y-axis direction) orthogonal to the thickness direction (Z-axis direction) of body 12. That is, a direction of attaching and detaching between connector 22 of body 12 and connector 30 of circuit board 26 is different by 90° from a direction of attaching and detaching between connector 32 of circuit board 26 and interface connector 28a of storage device 28. Connector 32 is also electrically connected to connector 30 through a circuit (not illustrated) on circuit board 26.

Storage unit 20 configured as described above allows connector 22 of body 12 and connector 30 of storage unit 20 to be removably connected in the thickness direction only by storing storage unit 20 in housing part 12c of body 12 in the thickness direction (Z-axis direction) of body 12.

This kind of connection does not require storage unit 20 to be slid in a direction orthogonal to the thickness direction (Z-axis direction) of body 12, e.g., in the width direction (X-axis direction) or in the depth direction (Y-axis direction), after storage unit 20 (i.e., storage device 28) is disposed in housing part 12c of body 12. As a result, body 12 is not required to secure a movement space of storage device 28 to be used only when storage device 28 is attached or detached.

Information processing device 10 according to the present exemplary embodiment has some features for achieving appropriate attachment of storage unit 20 to body 12, i.e., appropriate electrical connection between body 12 and storage device 28.

As illustrated in FIG. 2, information processing device 10 is configured to prevent storage unit 20 stored in housing part 12c of body 12 from falling off from body 12.

Specifically, as illustrated in FIG. 7, casing 24 of storage unit 20 includes projection 24b protruding from an end of body 12 on one side in the depth direction (Y-axis direction). Projection 24b is provided at an end of casing 24 on one side in the depth direction relatively far from connector 30.

For projection 24b, body 12 illustrated in FIG. 3 includes housing part 12c provided in its side surface 12g on one side in the depth direction (Y-axis direction) with projection insertion hole 12h into which projection 24b of storage unit 20 is inserted.

As illustrated in FIG. 6, casing 24 of storage unit 20 is provided at its end on the other side in the depth direction (Y-axis direction) with hook 24c. The end of casing 24, which is on the other side and provided with hook 24c, is in the depth direction and relatively close to connector 30.

For hook 24c, body 12 illustrated in FIG. 3 includes lock member 36 that engages with hook 24c of storage unit 20.

Figure 9:
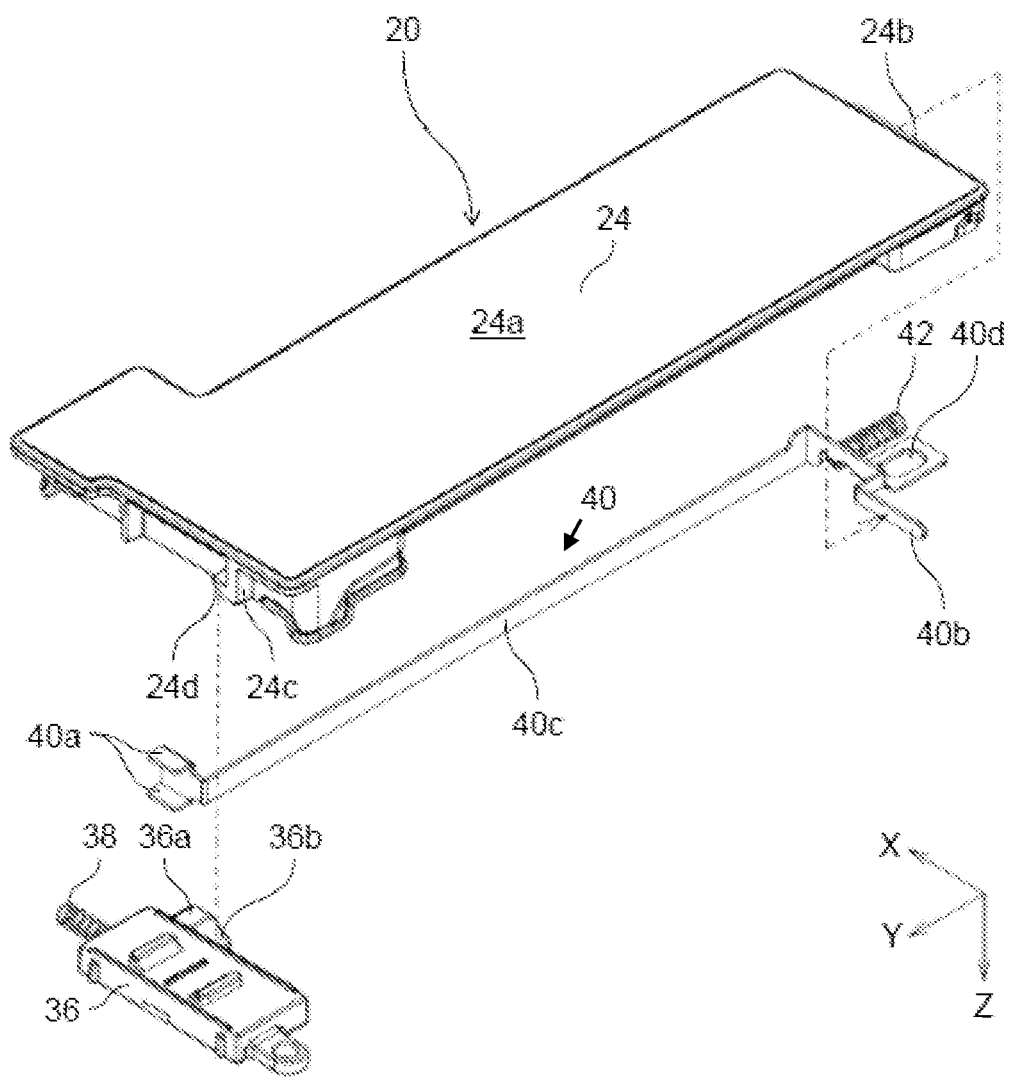
FIG. 9 is a perspective view of a lock member and a stopper plate provided in the body.

FIG. 9 is a perspective view of the lock member and a stopper plate provided in the body.

As illustrated in FIG. 9, lock member 36 includes latch knob 36a that engages with hook 24c of storage unit 20. As illustrated in FIG. 4, latch knob 36a protrudes into housing part 12c.

As illustrated in FIG. 9, lock member 36 is provided in body 12 in a movable manner in the width direction (X-axis direction) of body 12. Lock member 36 is pressed by spring 38 in the width direction (X-axis direction) of body 12.

With reference to FIG. 9, when hook 24c of storage unit 20 is moved toward latch knob 36a of lock member 36, i.e., when storage unit 20 is moved in the thickness direction (Z-axis direction) of body 12 toward the inside of housing part 12c of body 12, inclined surface 24d of hook 24c and inclined surface 36b of latch knob 36a come into contact with each other.

When hook 24c is further moved in the thickness direction (Z-axis direction) of body 12 with inclined surfaces 24d, 36b in contact with each other, the whole of lock member 36 moves in the width direction (X-axis direction) of body 12, i.e., in a direction of compressing spring 38.

When hook 24c is furthermore moved in the thickness direction (Z-axis direction) of body 12, the tip of hook 24c ascends over latch knob 36a, and then lock member 36 is moved toward an original position, at which lock member 36 is positioned before latch knob 36a comes into contact with hook 24c, with restoring force of spring 38. As a result, the tip of hook 24c is caught on a lower surface of latch knob 36a, and then hook 24c engages with latch knob 36a.

When projection 24b of storage unit 20 is inserted into projection insertion hole 12h in housing part 12c of body 12, i.e., when hook 24c of storage unit 20 engages with latch knob 36a of lock member 36, storage unit 20 is appropriately fixed to body 12, and thus being prevented from falling off from body 12.

When storage unit 20 is attached to body 12, storage unit 20 can be detached from body 12 by moving lock member 36 in the compression direction of spring 38 to release the engagement between hook 24c and latch knob 36a.

This kind of mounting structure of storage unit 20 and body 12 requires a user to first insert projection 24b of storage unit 20 into projection insertion hole 12h in housing part 12c when storing storage unit 20 in housing part 12c of body 12. After that, the user tilts storage unit 20 with projection 24b inserted into projection insertion hole 12h to connect connector 30 of storage unit 20 to connector 22 of body 12. Then, further tilting storage unit 20 causes hook 24c of storage unit 20 to engage with latch knob 36a of lock member 36.

In other words, after connector 30 of storage unit 20 is connected to connector 22 of body 12, projection 24b of storage unit 20 cannot be inserted into projection insertion hole 12h in housing part 12c of body 12. Thus, when connector 30 of storage unit 20 is connected to connector 22 of body 12 before projection 24b is inserted into projection insertion hole 12h, storage unit 20 cannot be appropriately fixed to body 12.

To prevent connection between connector 30 of storage unit 20 and connector 22 of body 12 before projection 24b of storage unit 20 is inserted into projection insertion hole 12h in housing part 12c of body 12, stopper 40a is provided in body 12 as illustrated in FIGS. 3 and 5.

Specifically, stopper 40a restricts ingress of storage unit 20 into housing part 12c before projection 24b of storage unit 20 is inserted into projection insertion hole 12h in housing part 12c of body 12. Thus, stopper 40a protrudes in the depth direction (Y-axis direction) of body 12 into housing part 12c, particularly into second housing space 12e in which connector 22 is disposed. When storage unit 20 comes into contact with stopper 40a protruding into housing part 12c as described above, ingress of storage unit 20 into housing part 12c is restricted.

Stopper 40a is configured to retreat from the inside of housing part 12c after projection 24b of storage unit 20 is inserted into projection insertion hole 12h in housing part 12c of body 12.

As illustrated in FIG. 3, stopper release lever 40b for retreating stopper 40a protruding into housing part 12c is specifically provided in projection insertion hole 12h. When stopper release lever 40b is pushed by projection 24b of storage unit 20, which is inserted into projection insertion hole 12h, stopper 40a retreats from housing part 12c. This enables ingress of projection 24b into housing part 12c of storage unit 20 after projection 24b is inserted into projection insertion hole 12h. As a result, connection between connector 30 of storage unit 20 and connector 22 of body 12 can be prevented before projection 24b of storage unit 20 is inserted into projection insertion hole 12h in housing part 12c of body 12.

Stopper 40a and stopper release lever 40b of the present exemplary embodiment are respectively parts (a first part and a second part) of stopper plate 40 that is a single component as illustrated in FIG. 9. That is, stopper 40a and stopper release lever 40b are connected by link 40c.

Stopper plate 40 is made of a metal material, and is provided in body 12 in a movable manner in the depth direction (Y-axis direction) of body 12. Stopper plate 40 is moved with a stroke limited by a screw (not illustrated) that passes through elongated hole 40d formed in stopper plate 40 and is fixed to body 12. Stopper plate 40 is also electrically connected to a metal portion of body 12 through the screw.

Stopper plate 40 as described above is configured such that when stopper release lever 40b is pushed by projection 24b of storage unit 20 and moved in the depth direction (Y-axis direction) of body 12, stopper 40a is also moved in the same direction and retreated from the inside of housing part 12c in conjunction with stopper release lever 40b. This enables stopper release lever 40b and stopper 40a to be interlocked with each other with a simple structure. Stopper plate 40 is pressed by spring 42 to allow stopper 40a to protrude into housing part 12c when projection 24b is not in contact with stopper release lever 40b.

When stopper release lever 40b of stopper plate 40, which is electrically connected to the metal portion of body 12, comes into contact with projection 24b of storage unit 20, static electricity of storage unit 20 can be released to the metal portion of body 12 through stopper plate 40. That is, the static electricity of storage unit 20 can be removed before connector 30 of storage unit 20 is connected to connector 22 of body 12. This enables a circuit board (not illustrated) mounted on body 12 and connected to connector 22 to be protected from the static electricity of storage unit 20.

The present exemplary embodiment as described above enables providing an attaching and detaching structure of storage device 28 in body 12 of information processing device 10 to which storage device 28 is removably attached, the attaching and detaching structure requiring no movement space used for storage device 28 only when storage device 28 is attached and detached.

Although the present disclosure has been described above by taking the above exemplary embodiment as an example, the present disclosure is not limited to the above exemplary embodiment.

For example, although storage device 28 removably attached to body 12 of information processing device 10 of the exemplary embodiment described above is an SSD based on the M.2 standard, the exemplary embodiment of the present disclosure is not limited thereto. The storage device may be an SSD based on another standard or a hard disk.

Although information processing device 10 of the exemplary embodiment described above is a laptop personal computer, the exemplary embodiment of the present disclosure is not limited thereto. For example, the information processing device may be a tablet-type personal computer including a touch screen display.

Although storage unit 20 of the exemplary embodiment described above is attached to body 12 while having a longitudinal direction parallel to the depth direction (Y-axis direction) of body 12 as illustrated in FIG. 2, the present disclosure is not limited thereto. Storage unit 20 may be attached to body 12 while having the longitudinal direction parallel to the width direction (X-axis direction) of body 12.

As illustrated in FIG. 7, storage unit 20 of the exemplary embodiment described above is provided at its one end in its longitudinal direction, i.e., in the depth direction (Y-axis direction) of body 12, with projection 24b. Alternatively, projection 24b may be provided at one end of storage unit 20 in its lateral direction, i.e., in the width direction (X-axis direction) of body 12. Projection 24b may protrude from an end of storage unit 20 on one side in a direction orthogonal to the thickness direction (Z-axis direction) of body 12.

As illustrated in FIG. 2, storage unit 20 of the exemplary embodiment described above includes casing 24 with lower surface 24a positioned substantially flush with lower surface 12b of body 12, the lower surfaces constituting a part of the bottom surface of information processing device 10. Alternatively, after the storage unit is stored in the housing part in a recessed shape, a lid cover for covering the housing part may be attached to the lower surface of the body. This case enables the lid cover to prevent the storage unit from falling off from the body. That is, projection 24b and the like of storage unit 20 can be eliminated.

In a broad sense, the information processing device according to the exemplary embodiment of the present disclosure includes a body in a plate shape, and a storage unit that is provided with a storage device and is removably attached to the body. The body includes a housing part in a recessed shape that is recessed in a thickness direction of the body and stores the storage unit, and a first connector provided on a bottom surface of the housing part. The storage unit includes a second connector connected to the first connector to be removably attached in the thickness direction.

As described above, the plurality of exemplary embodiments has been described as examples of the technique in the present disclosure. To this end, the accompanying drawings and detailed description are provided.

Thus, the components described in the accompanying drawings and detailed description include not only components essential for solving the above problem, but also components that are not essential. Consequently, when those non-essential components are described in the accompanying drawings and detailed description, the non-essential components should not be immediately acknowledged to be essential based on only the description.

The exemplary embodiments described above are intended to illustrate the technique in the present disclosure, and thus various changes, replacements, additions, eliminations, and the like may be made within the scope of claims and equivalents thereof.

The present disclosure is applicable to an information processing device including a body in a plate shape to which a storage device is removably attached.

What is claimed is:

1. An information processing device comprising:
a body in a plate shape; and
a storage unit that includes a storage device and is removably attached to the body,
the body including:
a housing part in a recessed shape that is recessed in a thickness direction of the body, the housing part storing the storage unit,
a first connector provided on a bottom surface of the housing part, and
a stopper that restricts ingress of the storage unit into the housing part;
the storage unit including a second connector connected to the first connector to be removably attached to in the thickness direction, and a projection protruding from an end of the storage unit on one side in a direction orthogonal to the thickness direction,
wherein the stopper restricts connection between the first connector and the second connector, and the stopper is retreated from an inside of the housing part by the projection of the storage unit, such that the second connector can thereafter be connected to the first connector;
wherein the housing part has a side surface including a projection insertion hole into which the projection is inserted;
wherein the body includes:
a stopper release lever provided in the projection insertion hole, and when the stopper release lever is pushed by the projection of the storage unit, the stopper is retreated from the inside of the housing part; and
wherein the stopper is a component made of a metal material, and the component is electrically connected to a metal part of the body.

2. The information processing device according to claim 1, wherein the storage unit further includes:
a third connector that is connected to an interface connector of the storage device in a direction orthogonal to the thickness direction; and
a circuit board on which the second connector and the third connector are mounted, the circuit board electrically connecting the second connector and the third connector.

3. The information processing device according to claim 1, wherein the storage unit includes a casing positioned substantially flush with a surface of the body provided with the housing part when the storage unit is stored in the housing part.

4. The information processing device according to claim 1, wherein the storage device is a hard disk or a solid state drive (SSD).

5. The information processing device according to claim 1, further comprising a display provided in the body in a rotatable manner.

6. The information processing device according to claim 1, wherein the second connector protrudes in the thickness direction.

* * * * *